(12) United States Patent
Nivens, Jr.

(10) Patent No.: US 6,264,838 B1
(45) Date of Patent: Jul. 24, 2001

(54) ON SITE WASTE WATER RECYCLING SYSTEM

(76) Inventor: Kirk N. Nivens, Jr., 16 Whale Branch Dr., P.O. Box 227, Seabrook, SC (US) 29940

( * ) Notice: Subject to any disclaimer, the term of this patent is extended or adjusted under 35 U.S.C. 154(b) by 0 days.

(21) Appl. No.: 09/081,330

(22) Filed: May 19, 1998

Related U.S. Application Data

(60) Provisional application No. 60/047,334, filed on May 21, 1997.

(51) Int. Cl.$^7$ .................................................. C02F 3/32
(52) U.S. Cl. ............................................................ 210/602
(58) Field of Search ............................................. 210/602

(56) References Cited

U.S. PATENT DOCUMENTS

| | | | |
|---|---|---|---|
| 3,933,641 | 1/1976 | Hadden et al. | 210/205 |
| 4,100,073 | 7/1978 | Hopcroft | 210/532.1 |
| 4,599,167 | 7/1986 | Benjes | 210/150 |
| 4,824,572 | 4/1989 | Scott | 210/602 |
| 4,826,601 | 5/1989 | Spratt | 210/610 |
| 4,895,645 | 1/1990 | Zorich | 210/98 |
| 4,971,690 | 11/1990 | Justice | 210/170 |
| 5,637,218 * | 6/1997 | Kickuth | 210/602 |
| 5,645,732 | 7/1997 | Daniels | 210/747 |
| 5,707,513 | 1/1998 | Jowett | 210/150 |
| 5,736,047 * | 4/1998 | Ngo | 210/602 |
| 5,738,781 | 4/1998 | Carlson | 210/170 |
| 5,766,474 * | 6/1998 | Smith et al. | 210/602 |
| 5,863,433 * | 1/1999 | Behrends | 210/602 |

OTHER PUBLICATIONS

"Rock–Plant Filter, An alternative for On Site Sewage Treatment", by Larry W. Amberg.

"Small Flows", West Virginia University, Morgantown, WV, Jul., 1989.

* cited by examiner

*Primary Examiner*—Chester T. Barry
(74) *Attorney, Agent, or Firm*—Smith, Gambrell & Russell, LLP

(57) ABSTRACT

A method of and system for naturally treating sewage suitable for residential dwellings on land which will not support a conventional septic tank and drain field are disclosed. The system includes a conventional septic tank, a rock/plant filter, a dosing chamber, a shallow horizontal flow pulsed planted aggregate filter, and an effluent holding tank.

2 Claims, 3 Drawing Sheets

ON-SITE WASTEWATER RECYCLING SYSTEM

ON-SITE WASTEWATER RECYCLING SYSTEM

PULSED PLANTED AGGREGATE FILTER

SECTION VIEW OF
PULSED PLANTED SHALLOW AGGREGATE FILTER

ON SITE WASTE WATER RECYCLING SYSTEM

This application claims the benefit under 35 U.S.C. §119(e) of provisional application Ser. No. 60/047,334, filed on May 21, 1997.

BACKGROUND OF THE INVENTION

For decades it has been recognized the proper treatment and disposal of human waste is essential to the control of the spread of disease. Pit or trench privies were the first successful methods of isolation of human excrement from insect transmission and pollution of surface waters on rural or sparsely populated land. While high in local odors, the pit privy was efficient in removal of bacteria and viruses. Studies have shown when the raw human waste is in direct contact with the ground water, bacteria or viruses associated with human waste could not be found more than nine feet from the privy wall. It was discovered the ground provided a reliable natural filter for removal of contaminants. Then followed the invention of the septic tank and drain field which allowed the installation of running water to flush away contaminants. A conventional septic tank and drain field disposal system consists of a closed anaerobic holding tank which allows the separation of oils, greases, waxes and soaps by flotation, and the removal of solids by settling. The septic tank has long been recognized as removing only 40 to 50% of the entering waste load, and does little to remove bacteria or viruses. The majority of treatment occurs in the drain field of the septic tank system. In order to provide effective treatment in the drain field, it must be aerobic (with oxygen) to support the microbes which remove the waste from the water. Once a drain field becomes flooded for a relatively short period, the desirable microbes are killed due to a lack of oxygen, and the soil becomes clogged by the waste filtered from the water but not mineralized by the microbes. In lay terms, this is called "septic tank failure". Septic tanks should have floating matter and settled solids removed every 7 to 10 years to avoid bleed over of those material to the drain field and subsequent drain field clogging. In reality, a septic tank rarely fails to perform its design function. Failures do occur in the drain field when solids, oils, grease, wax or soaps bleed through the septic tank to the drain field. The most common cause of failure of the drain field is flooding caused by hydraulically overloading the drain field beyond its disposal capacity by usage loading or, more often, storm water loading, which results in flooding of the drain field, resulting in the killing of the microbes necessary to provide treatment of the septic tank effluent. Once the microbes have been killed, clogging of the soil occurs rapidly, resulting in septic tank treatment system failure.

Prior art has addressed modification of elements of the septic tank and drain field treatment system, but none have shown a complete synergistic on site wastewater recycle system as divulged herein. The basic difference is the prior art modifications require the use of chemical feeds, routine replacement of elements, or frequent adjustments or cleaning. Control systems for the prior art modifications to a conventional septic tank and drain field system are often quite complex, expensive to construct initially, and require a qualified repairman for repair or adjustment. As examples, Carlson in U.S. Pat. No. 5,738,781 teaches the modification of a septic tank with chambers and granulated charcoal, but does not address further treatment or disposal; Jowett,et.al., in U.S. Pat. No. 5,707,513 teaches the use of foam cells for use with conventional septic tank effluent; Daniels in U.S. Pat. No. 5,645,732 teaches the use of a U shaped filter with fibrous filter material between an inner and outer casing, requiring the polymeric filter medium to be changed periodically; Scott in U.S. Pat. No. 4,824,572 teaches the use of a multi media filter consisting of gravel, limestone, straw or hay planted with reeds, followed by chlorination; Hopcroft in U.S. Pat. No. 4,100,073 teaches the use of a septic tank, a dosing chamber and an enclosed sand filter with disinfection unit; Spratt, et.al. in U.S. Pat. No. 4,826,601 teaches a highly aerobic first cell, followed by anaerobic sedimentation, the third cell is an upwelling flow through a porous anaerobic medium, then to a holding cell, then intermittently through a sand filter/dolomite bed, then to a drain field, with the feeding of alum and methanol optional in the first cell; Justice in U.S. Pat. No. 4,971,690 teaches the use of a septic tank, followed by a chlorine contact chamber (chemical feed), then to a natural filter media drain field below ground, then collection of the waste water effluent by a under drain system, then pumping the water for irrigation purposes; Hadden, et. al., in U.S. Pat. No. 3,933,641 teaches a treatment and recycling system consisting of a septic tank, then perforated splash pan to evenly distribute the effluent over a removable filter, then a second filter, then a holding tank, then chlorinated, then sprayed over the land surface or disposed of by other methods; Benjes, et. al., in U.S. Pat. No. 4,599,167 teaches the construction of an anaerobic digester with packed media with recirculation for the treatment of waste water and the production of methane; Zorich in U.S. Pat. No. 4,895,645 teaches the use of a closed multi chamber multi media biological filter tank between the septic tank and the drain field with a complex control system, but does not teach the plurality of multiple treatment cell types taught by the instant invention nor the synergistic use of plants. The instant invention provides all the synergistic artificial conditions to naturally treat the waste water to produce an effluent more than 99.5% pure while using no chemical feeds, no consumed materials, and no treatment method step which requires frequent maintenance, reliably and dependably. Being simple in design and operation, the instant system is economical to construct, operate, and maintain. The instant system provides the conditions required by nature to provide nearly complete treatment of wastewater, making it suitable to replace existing failed septic tank drain field systems, or to construct the system upon land which does not provide the conditions necessary for ordinary septic tank drain fields to properly function.

SUMMARY OF THE INVENTION

A method of naturally treating sewage is disclosed that is particularly suitable for application for one or a group of residential dwellings on land which will not support a conventional septic tank and drain field system due to adverse soil conditions or elevated ground water table. The system uses no chemicals, is low in maintenance, and is constructed of primarily naturally occurring materials and plants to provide nearly complete removal of Bacteria, Biochemical Oxygen Demand, Suspended Solids, and in periods with warm climates results in little or no effluent to discharge. The system uses a conventional septic tank, a rock/plant filter, a dosing chamber, a shallow horizontal flow pulsed planted aggregate filter, and effluent holding tank. When effluent is produced, it exceeds the quality normally associated with tertiary treatment of domestic wastewater and is therefore suitable for irrigation recycling or other effluent disposal methods.

The following are the objects and advantages of the present invention:

a) to provide a useful on site sewage treatment facility on land with soil or elevated water table unsuitable for a conventional septic tank and drain field disposal system;
b) to provide an on site sewage treatment facility which utilizes natural processes and plants in synergy for sewage treatment;
c) to provide an on site sewage treatment facility which is low maintenance, yet highly reliable;
d) to provide an on site sewage treatment facility which meets or exceeds regulatory department standards and requirements, allowing environmentally responsible usage;
e) to provide an on site sewage treatment facility which makes otherwise unusable land valuable;
f) to provide an on site sewage treatment facility which is relatively inexpensive to build and operate when compared with other standard methods of sewage treatment on land with poor soil attributes.
g) to provide an on site sewage treatment facility which conserves water and energy.
h) to provide an on site wastewater treatment facility which requires no chemical feeds nor routine operator monitoring and adjustment.

Further objects and advantages will become apparent from a consideration of the ensuing description and drawings.

DETAILED DESCRIPTION OF THE PREFERRED EMBODIMENTS

Figure 1:
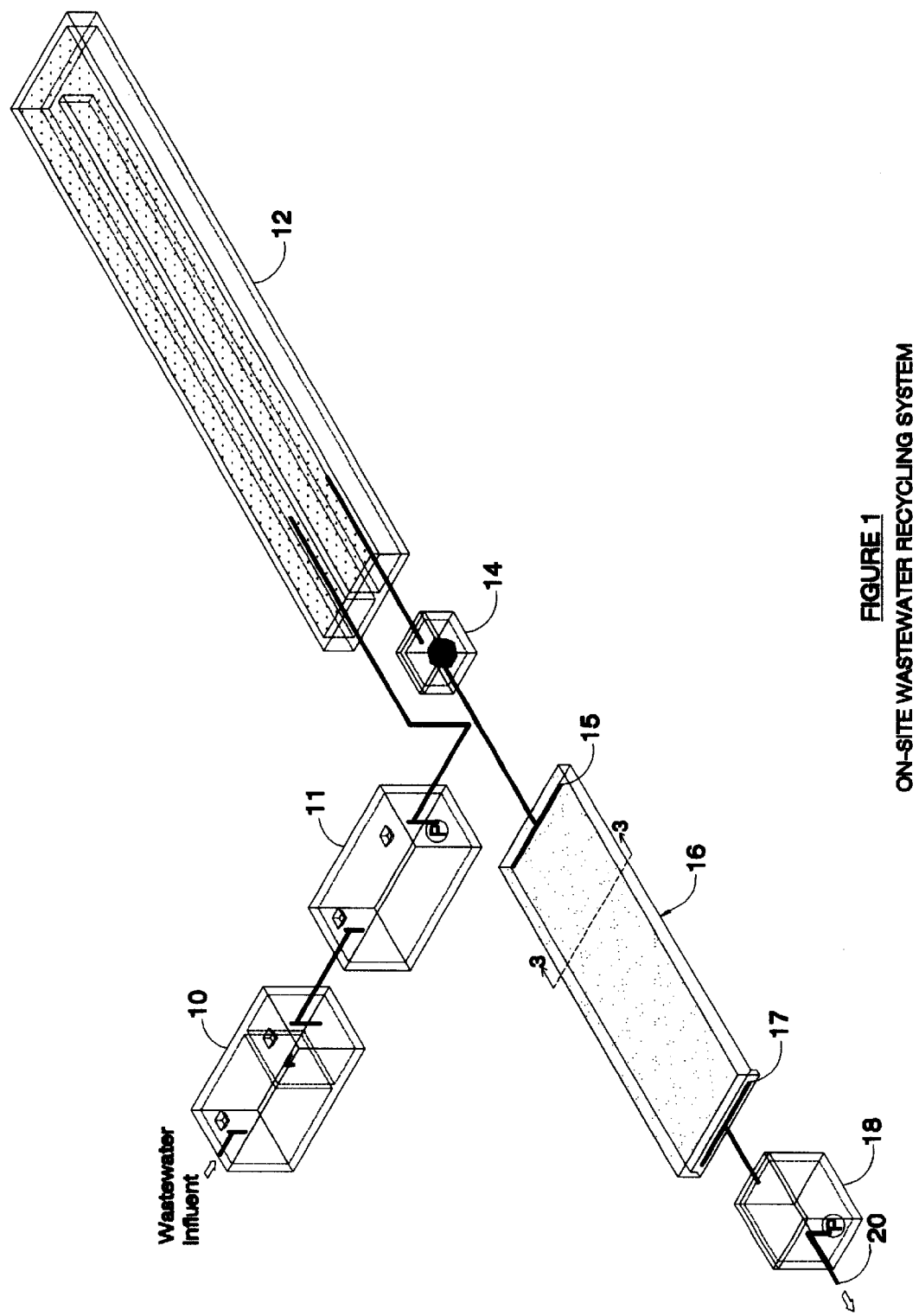
FIG. 1 shows major system components and component interconnections used to construct the invention disclosed herein.

REFERENCE NUMERALS IN DRAWINGS 10 septic tank
12 wetlands rock plant filter
14 dosing tank
16 pulsed planted shallow aggregate filter
18 processed effluent holding tank
20 waste water effluent disposal system
15 distribution header
17 collection header
19 impervious membrane
21 pervious separation membrane
22 top soil
23 planted select vegetation
24 aggregate Description—FIG. 1

A typical and preferred embodiment of the present invention is as depicted in FIG. 1 and as follows; A sealed septic tank(s) 10 having two or more internal chambers as is typical in the industry, having an inlet connected to a main sewage feed line flowing from residential or commercial structure (s). Connected to the outlet of the septic tank 10 is a standard sewer line of type required which is connected to a inlet of the wetlands rock plant filter 12. The wetlands rock plant filter 12 being constructed according to published standards in the industry. Connected to an outlet of the wetlands rock plant filter 12 is a standard sewer line of type required to an inlet of the dosing tank 14. The dosing tank contains a single automatic inverted siphon to pulse the planted shallow aggregate filter. Connected to an outlet of the dosing tank 14 is a standard sewer line of type required which is connected to an inlet of the pulsed planted aggregate filter 16. Connected to a outlet of the pulsed planted aggregate filter 16 is a standard sewer line of type required which is connected to a inlet of the sealed processed effluent holding tank 18. Contained within the processed effluent 18 holding tank is a commercially available pump and pipe which is connected to the inlet of effluent disposal system 20. Connected to the outlet of the effluent disposal system 20 are optionally sprayer nozzles of type and configuration required by the effluent spray system 20, or alternatively, the effluent may be disposed of through other preferred means, such as direct system discharge, or discharge to a mounded drain field, or be further treated for other uses, or be recycled.

An alternative embodiment of the present invention is a multiple number of the above systems or multiple number of components of the system operating in parallel or in series. This embodiment allows the system to be scaleable and to handle greater amounts of raw sewage and to produce the quality of effluent required for the specific application.

All components utilized in the present invention are disclosed by other prior art references, save and except only the shallow pulsed planted aggregate horizontal flow filter. Many of these components such as the septic tank(s) 10, dosing tank 12, processed effluent holding tank 18, effluent spray system 20 are readily available from commercial sources. The wetlands rock plant filter 12 and the planted pulsed aggregate filter 16 are structures which must be constructed on site. There are numerous public references regarding the construction of rock plant filters. Although these prior art references disclose all but one of the individual component of the present invention, they do not disclose the total synergetic system disclosed by the present invention, nor do they disclose the use of a planted shallow horizontal aggregate filter as a tertiary filter which requires no backwash, no chemical feed, nor periodic cleaning. The aerobic conditions created by the planted shallow aggregate filter, coupled with the plant roots' uptake of nutrient laden water during pulsed flow, creates an organic synergy similar to that of a rock plant filter. But, the wetlands rock plant filter continuously holds water creating continuously anaerobic conditions in the lower levels of the wetlands rock plant filter. Conversely, the planted pulsed aggregate filter is continuously aerobic through out and does not continuously hold any water other than moisture on the aggregate surfaces, within microbial growth, and on plant roots.

Wetlands rock plant filters 12 are constructed by placing appropriately sized gradated rock media in a narrow, rectangular trench of the required size/length into which selected aquatic plants are rooted. The rock plant filter should maintain a liquid depth of approximately two-thirds of its total media depth even during periods of no flow. The total rock depth should be maintained at 18 inches minimum. The minimum width of a rock plant filter should be two feet and the minimum volume of 210 cubic feet measured from the invert of the outlet. In areas where it has been determined there is a problem with ground water the rock plant filter trenches should be lined with an impervious membrane. A 210 cubic foot filter is adequately sized for design flows of up to 400 gallons per day of typical domestic wastewater. For greater design flows, the required total volume must be increased by 50 cubic feet for each 100 gallons per day or portion thereof. To prevent clogging and channelization in the filter media, the influent line from the septic tank(s) 10 should extend 10 feet into the filter and must be capped. This section of pipe must be of the perforated type and the invert of the pipe should be laid at the liquid level.

Figure 2:
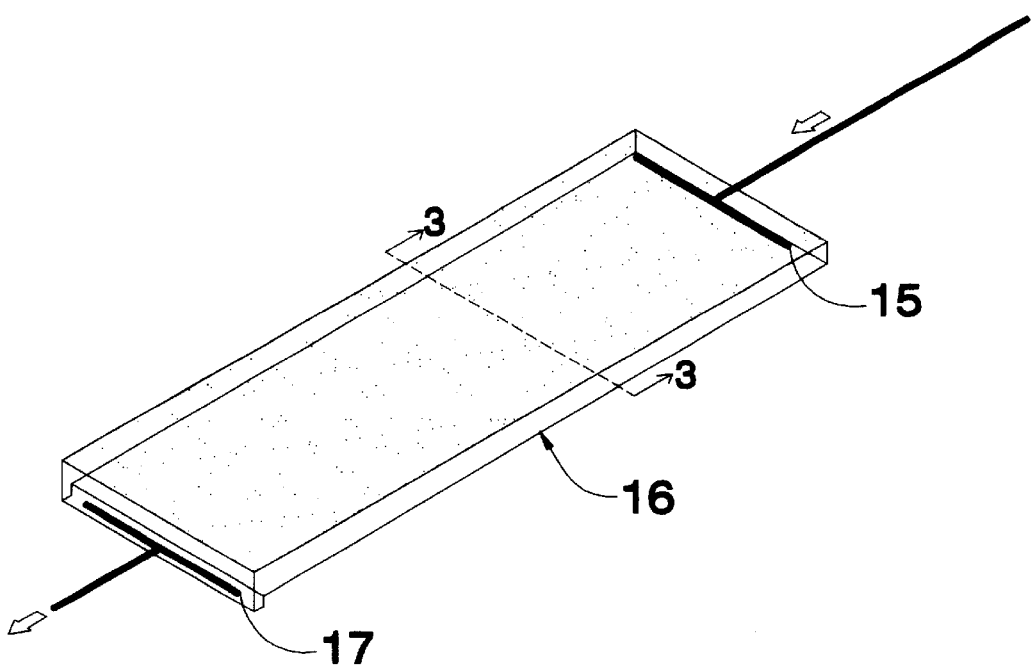
FIG. 2 shows the pulsed planted shallow aggregate filter.
Figure 3:
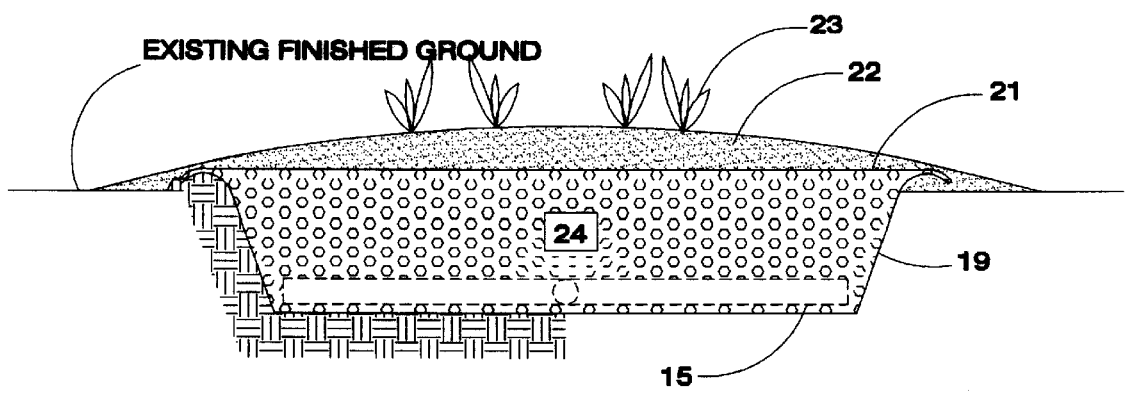
FIG. 3 shows a cross section detail of the pulsed planted shallow aggregate filter.

A pulsed planted shallow aggregate filter 16 is shown by FIG. 2 constructed by placing appropriately sized aggregate media 24 in a rectangular trench with a continuous impervious membrane 19 on the bottom and four sides, said side impervious membrane 19 is to extend above existing ground level to preclude the drainage of surface water run off into the filter aggregate media 24. The influent pipe and effluent pipe is to pass through the impervious membrane 19 on opposed sides of the filter and be sealed to preclude the entry of groundwater. The influent pipe is connected to an influent distribution header 15. The influent distribution header 15, extends the full length of the end of pulsed planted aggregate filter 16, is constructed of pipe solidly capped on both ends, and contains a plurality of holes through the side walls of the pipe for the even distribution of wastewater influent across the width of the pulsed planted aggregate filter 16. The distributiopn header is placed above the impervious bottom membrane 19 on a bed of aggregate to aid in influent distribution. The planted pulsed aggregate filter 16 is constructed of adequate dimensions to pass the load applied to it (gallons per minute) by the dosing tank 14. The liquid should be allowed to drain completely from the planted pulsed aggregate filter 16 between pulses from the dosing tank 14. Drainage from the influent distribution header 15, is enhanced by sloping the bottom of the pulsed planted aggregate filter 16, from the influent distribution header 15 to the effluent collection header 17. The formation of aerobic microbial growth on the aggregate media 24 enhances treatment efficiency. Maintenance of aerobic conditions within the filter aggregate media 24 is critical to continued reliable treatment performance. The effluent collection header 17 is identical in construction to the influent distribution header 15, but is placed in a depression at the effluent end of the pulsed planted aggregate filter 16, surrounded by aggregate 24, to insure drainage between pulsed loading cycles. FIG. 3, shows the preferred embodiment of the pulsed planted shallow aggregate filter 16 in sectional view as indicated on FIG. 2. The influent distribution header 15, is shown in phantom within the aggregate media 24, as the aggregate media 24 is separated from the ground by the impervious membrane 19 on the sides and bottom of the pulsed planted shallow aggregate filter 16. The impervious membrane 19 extends above the existing finished ground to preclude the entry of ground water run off. The aggregate media 24, is separated from top soil 22, by the use of a pervious separation membrane 21 over the entire length and width of the pulsed planted shallow aggregate filter 16. Planted in the top soil 22 is planted select vegetation 23 over the entire width and length of top soil 22 which covers the entire width and length of the pulsed planted shallow aggregate filter 16.

Due to variance in topography of land and varying design capacities of this system, pumps P and pump control devices may be required between components for proper operation as indicated in FIG. 1. While these pumping devices are not necessary for proper treatment of the waste water, installation may be required if land topography will not allow gravity flow through the system. The size of the components used and aggregate gradation in the system will vary depending upon design capacity of the waste water treatment system both with respect to quality and quantity.

Operation—FIG. 1

The operation of the system provided by the present invention is as follows:

Raw sewage flows from the residential or commercial building structure into the septic tank(s) 10. The septic tank(s) allow solids to settle out of the effluent and anaerobic bacteria to breakdown organic materials. The purpose of the said septic tank is to provide separation of the oils, greases, wax and soaps by providing baffles at the entry into the tank and at the tank exit to allow these floating materials to rise to the surface of the fluid in the tank where they are stored and to provide adequate retention time in anaerobic conditions to settle solids to the floor of the septic tank where they are partially mineralized until both the settled and mineralized solids and the oils, wax, grease and soaps are physically removed by a septic tank pumping contractor every 7 to 10 years. The septic tank(s) is estimated to provide 40 to 50% removal of suspended solids and Biochemical Oxygen Demand of the total sewage treatment system.

The effluent flows from the septic tank(s) 10 to the wetlands rock plant filter 12. The wetlands rock plant filter 12 reduces BOD, toxic organic chemicals, heavy metals and radioactive elements through an anaerobic/aerobic biological process. In warm weather periods, the planted wetlands rock filter has little or no effluent discharge due to evapotranspiration. The demonstration rock plant filter has performed consistently over a six year period in reducing effluent Biological Oxygen Demand to 5 milligrams per liter or less, suspended solids to less than 10 milligrams per liter and bacteria reduction of 98% or greater.

The effluent flows from the wetlands rock plant filter to the dosing tank 14. The dosing tank collects effluent until the dosing tank becomes full. The dosing tank then charges the pulsed planted aggregate filter 16. The pulsed planted aggregate filter drains by gravity to the effluent holding tank 18. The effluent from the demonstration pulsed planted aggregate filter indicates a removal rate of 98% of the bacteria, suspended solids and Biochemical oxygen demand from the influent entering the pulsed planted aggregate filter 16.

The effluent then flows to the processed effluent holding tank 18 and is held until needed by the effluent spray system 20, or alternative disposal method. After completing the above treatment, the effluent water is equivalent to, or better than, ordinary land run off water produced during rain fall events. The effluent spray system is a lawn or plant care watering system as typically installed on residential home sites. When the timer or control unit signals the sprayer system to turn on, the sprayer system pumps the effluent from the processed effluent holding tank 18 to the outlet nozzles in the effluent sprayer system 20. Under this option, the effluent is sprayed over the entire property surface and is disposed of through evaporation, infiltration, and plant root uptake. In times of drought or low effluent production, the lawn could be irrigated with make up water from other sources. In small community systems, the effluent may be used to irrigate community plantings or the roadway right of way.

The system disclosed by the present invention is a synergetic system. The treatment units are not sufficiently effective individually, but when combined allows the on site treatment of sewage and disposal of effluent which would otherwise not be treatable on otherwise unacceptable or failed sites. This system is also environmentally conservation minded since it beneficially reuses water that might otherwise be wasted, and can easily remediate a site after an existing drain field has failed.

I claim:

1. An improved method of removing contaminants from water, which comprises:

(a) maintaining a flow storage chamber for contaminant containing water;

(b) maintaining an inverted siphon or pump to pulse plug flow the contaminant containing water from the said flow storage chamber;

(c) maintaining a bed of particulate containing substrate with bottom of said bed sloped to drain;

(d) maintaining an inflow distribution perforated header pipe embedded transverse within said bed of particulate containing substrate connected by piping to said inverted siphon or pump;

(e) maintaining a flow collector perforated header pipe embedded transverse within the said bed of particulate containing substrate opposite the said inflow distribution header;

(f) maintaining a planting of vegetation upon the upper face of the said bed of particulate substrate;

(g) maintaining a flow storage reservoir connected by piping to drain effluent of the said bed of particulate containing substrate at all times;

(h) repetitiously introducing water containing contaminant into the said particulate containing substrate via the said inverted siphon or pump in sufficient pulsed plug flow quantity to inundate the said particulate substrate causing alternating time periods of aerobic and anaerobic conditions within the said bed of particulate containing substrate;

(i) maintaining said alternating periods of aerobic and anaerobic conditions creates a microbial biofilm upon the surfaces of the said particulate surfaces effective in the reduction of said water contaminants;

(j) maintaining the said planting of vegetation upon the upper face of the said bed of particulate substrate contributing to the removal of water containing contaminant nutrients and reduces water flow through evaporation and transpiration through said plant root system uptake and associated microbial activity;

(k) effluent water produced by the combination of the said elements substantially reduces the contaminant concentration levels when compared with the influent water contaminant concentrations.

2. The process of claim 1, wherein the said process is preceded by flowing said contaminant containing water through:

(a) a septic tank for the purpose of anaerobic pretreatment of water containing contaminants by the settlement of solids and floatation separation of oils, greases, and waxes, said septic tank communicating by conduit connection to a flow storage reservoir;

(b) said flow storage reservoir containing a pump with float controls; and (c) said pump communicating by conduit connection with a planted rock wetland filter.

* * * * *